United States Patent

Nakada et al.

[11] Patent Number: 5,670,594
[45] Date of Patent: Sep. 23, 1997

[54] LOW WATER-ABSORPTIVE OCULAR LENS MATERIAL, LOW WATER-ABSORPTIVE OCULAR LENS SHAPED PRODUCT MADE THEREOF, LOW WATER-ABSORPTIVE OCULAR LENS MADE THEREOF AND PROCESS FOR ITS PRODUCTION

[75] Inventors: Kazuhiko Nakada; Noriko Yoshimatsu, both of Kasugai; Shoji Ichinohe; Toshio Yamazaki, both of Gunma-ken, all of Japan

[73] Assignee: Menicon Co., Ltd., Nagoya, Japan

[21] Appl. No.: 731,982

[22] Filed: Oct. 23, 1996

[30] Foreign Application Priority Data

Oct. 24, 1995 [JP] Japan .................... 7-275774

[51] Int. Cl.$^6$ .................................................. C08F 30/08
[52] U.S. Cl. ........................................................ 526/279
[58] Field of Search ............................................. 526/279

[56] References Cited

U.S. PATENT DOCUMENTS

| | | |
|---|---|---|
| 3,480,016 | 11/1969 | Costanza et al. |
| 3,951,893 | 4/1976 | Gander ................... 526/279 |
| 4,594,401 | 6/1986 | Takahashi et al. ........ 526/279 |
| 5,041,511 | 8/1991 | Yanagawa et al. ........ 526/279 |

FOREIGN PATENT DOCUMENTS

| | | | |
|---|---|---|---|
| 0108886 | 5/1984 | European Pat. Off. | 526/279 |
| 0387706 | 9/1990 | European Pat. Off. | 526/279 |
| 0494842 | 7/1992 | European Pat. Off. | 526/279 |
| 62-50728 | 3/1987 | Japan | 526/279 |
| 62-235919 | 10/1987 | Japan | 526/279 |
| 63-37312 | 2/1988 | Japan | 526/279 |
| 2170809 | 7/1990 | Japan | 526/279 |
| 3160009 | 7/1991 | Japan | 526/279 |
| 4-23819 | 1/1992 | Japan | 526/279 |
| 4-342704 | 11/1992 | Japan | 526/279 |
| WO86/01518 | 3/1986 | WIPO | 526/279 |

*Primary Examiner*—Joseph L. Schofer
*Assistant Examiner*—N. Sarofim
*Attorney, Agent, or Firm*—Oblon, Spivak, McClelland, Maier & Neustadt, P.C.

[57] ABSTRACT

A substantially non-crosslinked low water-absorptive ocular lens material obtained by polymerizing polymerizable components comprising a methoxysilane compound (A) of the formula (I):

$$X-Z-Si(OCH_3)_n(R^1)_{3-n} \qquad (I)$$

wherein X is a (meth)acryloyloxy group, a vinyl group, a group of the formula $H_2C=CH$

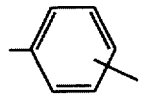

or an allyl group, Z is a direct bond or a $C_{1-3}$ alkylene group, $R^1$ is a $C_{1-6}$ alkyl group, and n is an integer of from 1 to 3, and a hydrophobic silicon-containing monomer (B) which is copolymerizable with the methoxysilane compound (A) and which undergoes no crosslinking reaction.

9 Claims, No Drawings

LOW WATER-ABSORPTIVE OCULAR LENS MATERIAL, LOW WATER-ABSORPTIVE OCULAR LENS SHAPED PRODUCT MADE THEREOF, LOW WATER-ABSORPTIVE OCULAR LENS MADE THEREOF AND PROCESS FOR ITS PRODUCTION

The present invention relates to a low water-absorptive ocular lens material, a low water-absorptive ocular lens shaped product made thereof, a low water-absorptive ocular lens made of such a shaped product and a process for producing such a lens. More particularly, it relates to an ocular lens material to which a shaping method capable of producing a large quantity of ocular lenses such as contact lenses or intraocular lenses all at once at a low cost is applicable, an ocular lens shaped product made of such an ocular lens material, a low water-absorptive ocular lens which is made of such an ocular lens shaped product and which is excellent not only in the transparency and oxygen permeability but also in the dimensional stability and durability, and a process for producing such an ocular lens with high precision at high productivity.

The properties required for ocular lenses include dimensional stability and durability, which have been regarded as particularly important in recent years. In order to obtain ocular lenses excellent in such dimensional stability and durability, it has heretofore been attempted to employ e.g. a polymer having a crosslinked structure.

To prepare ocular lenses made of a polymer having such a crosslinked structure, it is common to employ a lathe cutting and grinding method wherein the obtained polymer is processed into a desired shape by cutting and grinding, or a cast molding method wherein polymerization is carried out in a mold having a desired lens shape to obtain a lens.

However, when the above-mentioned lathe cutting and grinding method is employed, during preparation of lens blanks made of a polymer having a crosslinked structure, polymerization shrinkage takes place due to crosslinking, which leads to a problem that the operation efficiency tends to be low. Further, major portions of lens blanks except for the portions which eventually become lenses, will be cut off or ground off by the cutting or grinding processing. This is extremely uneconomical particularly when an expensive monomer is employed. Further, it is extremely cumbersome to apply cutting and grinding processing to many blanks individually, and a mass production, as in the case of the cast molding method, is impossible by the cutting and grinding method. Therefore, there is an additional problem that the productivity is poor.

On the other hand, when the cast molding method is employed, there is a problem that polymerization shrinkage takes place during the polymerization of the polymerizable components in the mold, whereby it is very difficult to mold ocular lenses of a desired specification precisely.

As a means to solve the problem of such cast molding method i.e. as a means to obtain ocular lenses by suppressing polymerization shrinkage during polymerization of the polymerizable components, a method has, for example, been proposed wherein in a case of polymerizing a monomer for imparting water absorptivity, an inert solvent is added to the monomer followed by casting and polymerization, and then the solvent is replaced by water to obtain a desired ocular lens (Japanese Unexamined Patent Publication No. 110311/1992).

However, when such a solvent is used for casting and polymerization, there will be a problem such that the solvent will remain without being replaced by water, so that the safety of the resulting ocular lens to eye tissues will deteriorate, a problem such that it takes substantial time for the operation of replacing the solvent by water, or a problem such that the resulting ocular lens tends to be inferior in the mechanical strength or dimensional stability.

As a method for shaping a material made of a plastic, it is common to employ a molding method wherein the material is melted or dissolved for shaping, such as an injection molding method or a compression molding method, whereby molding can be carried out at a low cost and in a large quantity.

However, such a molding method is practically inapplicable to shaping of a crosslinked material which can not be melted by heat or can not be dissolved in a solvent.

Such a molding method is applicable to shaping of a non-crosslinked material, but the molded product thereby obtained has no crosslinking structure and thus is inferior in the dimensional stability or durability.

Thus, the above-mentioned molding method which makes mass production possible at a low cost, can not be applied to a case where a ocular lens excellent in the dimensional stability or durability is to be obtained from a polymer having a crosslinked structure, as mentioned above.

The present invention has been made in view of the above-described prior art, and it is an object of the present invention to provide an ocular lens material to which a molding method which makes mass production feasible at a low cost, is applicable, as well as a process for producing an ocular lens from such a material at high productivity and with high precision and an ocular lens excellent in the oxygen permeability, dimensional stability and durability.

The present invention provides ① a substantially non-crosslinked low water-absorptive ocular lens material obtained by polymerizing polymerizable components comprising a methoxysilane compound (A) of the formula (I):

$$X-Z-Si(OCH_3)_n(R^1)_{3-n} \qquad (I)$$

wherein X is a (meth)acryloyloxy group, a vinyl group, a group of the formula $H_2C=CH$

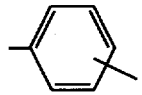

or an allyl group, Z is a direct bond or a $C_{1-3}$ alkylene group, $R^1$ is a $C_{1-6}$ alkyl group, and n is an integer of from 1 to 3, and a hydrophobic silicon-containing monomer (B) which is copolymerizable with the methoxysilane compound (A) and which undergoes no crosslinking reaction; ② a low water-absorptive ocular lens shaped product obtained by shaping the above low water-absorptive ocular lens material into a shape of a desired ocular lens; ③ a low water-absorptive ocular lens obtained by crosslinking the above low water-absorptive ocular lens shaped product; and ④ a process for producing a low water-absorptive ocular lens which comprises polymerizing polymerizable components comprising a methoxysilane compound (A) of the formula (I):

$$X-Z-Si(OCH_3)_n(R^1)_{3-n} \qquad (I)$$

wherein X is a (meth)acryloyloxy group, a vinyl group, a group of the formula $H_2C=CH$

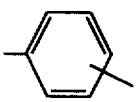

or an allyl group, Z is a direct bond or a $C_{1-3}$ alkylene group, $R^1$ is a $C_{1-6}$ alkyl group, and n is an integer of from 1 to 3, and a hydrophobic silicon-containing monomer (B) which is copolymerizable with the methoxysilane compound (A) and which undergoes no crosslinking reaction, to obtain a substantially non-crosslinked low water-absorptive ocular lens material, shaping the low water-absorptive ocular lens material into a shape of a desired ocular lens, to obtain a low water-absorptive ocular lens shaped product, and contacting the low water-absorptive ocular lens shaped product with water to crosslink the low water-absorptive ocular lens shaped product.

Now, the present invention will be described in detail with reference to the preferred embodiments.

The low water-absorptive ocular lens material of the present invention is the one obtained by polymerizing polymerizable components comprising a methoxysilane compound (A) of the formula (I):

$$X-Z-Si(OCH_3)_n(R^1)_{3-n} \qquad (I)$$

wherein X is a (meth)acryloyloxy group, a vinyl group, a group of the formula $H_2C=CH$

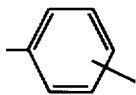

or an allyl group, Z is a direct bond or a $C_{1-3}$ alkylene group, $R^1$ is a $C_{1-6}$ alkyl group, and n is an integer of from 1 to 3, and a hydrophobic silicon-containing monomer (B) which is copolymerizable with the methoxysilane compound (A) and which undergoes no crosslinking reaction, and is substantially non-crosslinked, as mentioned above.

The methoxysilane compound (A) to be used in the present invention, is a compound of the formula (I) and is a component which polymerizes with other polymerizable components such as the hydrophobic silicon-containing monomer (B) and which induces a crosslinking reaction upon contact with water at the time of shaping a shaped product of the resulting ocular lens material into an ocular lens.

For example, as shown below, a crosslinking reaction occurs by a condensation (hydrolysis) reaction between methoxysilane groups derived from the methoxysilane compound (A) which is present in the ocular lens shaped product, whereby the resulting ocular lens will have a crosslinked structure.

The above methoxysilane compound (A) is the one having a methoxy group bonded to the silicon atom. Therefore, when such a methoxysilane compound (A) is employed, the condensation reaction (crosslinking reaction) proceeds swiftly as compared with a silane compound having an alkoxyl group with at least two carbon atoms bonded to the silicon atom. Accordingly, for example, even if the water absorptivity of the resulting low water-absorptive ocular lens material is high, the hydration swelling rate of a shaped product obtained from such an ocular lens material will never be larger than the crosslinking rate of the shaped product. Thus, the shaped product having a desired lens shape will be crosslinked substantially in that shape without deformation by swelling, whereby a low water-absorptive ocular lens having a desired shape can be obtained with high precision.

In the formula (I) representing the methoxysilane compound (A), each of the (meth)acryloyloxy group, the vinyl group, the group of the formula $H_2C=CH$

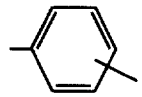

and the allyl group, represented by X, is a polymerizable group containing an unsaturated double bond Z, $R^1$ and n may suitably be determined taking the reactivity for the condensation reaction into consideration. Further, n is an integer of from 1 to 3, but particularly preferably, it is 2 or 3.

In this specification, "(meth)acryl . . . " means "acryl . . . and/or methacryl . . . ".

Typical examples of the above methoxysilane compound (A) include trimethoxysilylpropyl (meth)acrylate, vinyl trimethoxysilane, and trimethoxysilyl styrene. These compounds may be used alone or in combination as a mixture of two or more of them.

Among them, taking into consideration the copolymerizability with the hydrophobic silicon-containing monomer (B), trimethoxysilyl styrene is particularly preferred, when hydrophobic silicon-containing monomer (B) having a vinyl type polymerizable group such as a vinyl group, a group of the formula $H_2C=CH$

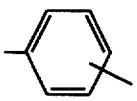

or an allyl group is used, and trimethoxysilylpropyl (meth)acrylate is particularly preferred, when a hydrophobic silicon-containing monomer (B) having a (meth)acrylate type polymerizable group, such as a (meth)acryloyl group, is employed.

The content of the methoxysilane compound (A) in the polymerizable components, is preferably at least 20 mol %, more preferably at least 25 mol %, in order to increase the probability that methoxysilane groups derived from the methoxysilane compound (A) in the shaped product made of the resulting ocular lens material, are present close to one another and consequently to facilitate the crosslinking reaction so that the desired ocular lens can readily be produced. Further, in order to avoid the possibility that the number of methoxysilane groups in the ocular lens material is so large that the crosslinking density is too high, and the finally obtainable ocular lens tends to be brittle, or the elongation or the mechanical strength tends to be low, the content of the methoxysilane compound (A) in the polymerizable components, is preferably at most 95 mol %, more preferably at most 90 mol %.

The hydrophobic silicon-containing monomer (B) to be used in the present invention is a kind of a polymerizable compound which is copolymerizable with the above methoxysilane compound (A) and which undergoes no crosslinking reaction, and it is a component useful to impart excellent oxygen permeability to the finally obtainable ocular lens and to lower its water content, i.e. a component to impart oxygen permeability to the low water-absorptive ocular lens material and to suitably control the water content thereof.

Typical examples of such a hydrophobic monomer (B) include monomers other than the methoxy silane compound (A), for example, an organopolysiloxane-containing alkyl (meth)acrylate such as pentamethyldisiloxanylmethyl (meth)acrylate, trimethylsiloxydimethylsilylpropyl (meth) acrylate, methylbis(trimethylsiloxy)silylpropyl (meth) acrylate, tris(trimethylsiloxy)silylpropyl (meth)acrylate, mono[methylbis(trimethylsiloxy)siloxy]bis(trimethyl siloxy)silylpropyl (meth)acrylate, tris[methylbis (trimethylsiloxy)siloxy]silylpropyl (meth)acrylate, methyl [bis(trimethylsiloxy)]silylpropylglyceryl (meth)acrylate, tris (trimethylsiloxy)silylpropylglyceryl (meth)acrylate, mono [methylbis(trimethylsiloxy)siloxy]bis(trimethyl siloxy) silylpropylglyceryl (meth)acrylate, trimethylsilylethyltetramethyldisiloxanylpropylglyceryl (meth)acrylate, trimethylsilylmethyl (meth)acrylate, trimethylsilylpropyl (meth)acrylate, trimethylsilylpropylglyceryl (meth)acrylate, pentamethyldisiloxanytpropylglyceryl (meth)acrylate, methylbis(trimethylsiloxy) silylethyltetramethyl disiloxanylmethyl (meth)acrylate, tetramethyltriisopropylcyclotetrasiloxanylpropyl (meth) acrylate, tetramethyltriisopropylcyclotetrasiloxybis (trimethyl siloxy)silylpropyl (meth)acrylate, or trimethylsiloxydimethylsilylpropyl (meth)acrylate; an alkylvinyl silane such as trimethylvinyl silane; and an organopolysiloxane-containing styrene derivative of the formula (II):

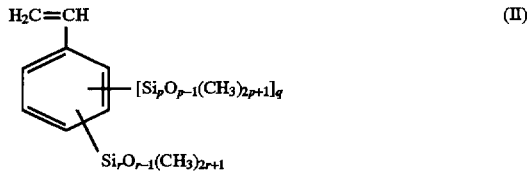

wherein p is an integer of from 1 to 15, q is 0 or 1, and r is an integer of from 1 to 15.

With respect to the organopolysiloxane-containing styrene derivative of the above formula (II), if p or r is an integer of 16 or higher, its synthesis or purification tends to be difficult, or the hardness of the resulting ocular lens material tends to remarkably decrease. Further, if q is an integer of 2 or higher, the synthesis of such an organopolysiloxane-containing styrene derivative tends to be difficult.

Typical examples of the styrene derivative of the above formula (II) include tris(trimethylsiloxy)silyl styrene, bis (trimethylsiloxy)methylsilyl styrene, dimethylsilyl styrene, trimethylsilyl styrene, tris(trimethylsiloxy) siloxanyldimethylsilyl styrene, [bis(trimethylsiloxy) methylsiloxanyl]dimethylsilyl styrene, pentamethyldisiloxanyl styrene, heptamethyltrisiloxanyl styrene, nonamethyltetrasiloxanyl styrene, pentadecamethylheptasiloxanyl styrene, heneicosamethyldecasiloxanyl styrene, heptacosamethyltridecasiloxanyl styrene, hentriacontamethylpentadecasiloxanyl styrene, trimethylsiloxypentamethyldisiloxymethylsilyl styrene, tris(pentamethyldisiloxy)silyl styrene, (tristrimethylsiloxy)siloxanylbis(trimethylsiloxy) silyl styrene, bis(heptamethyltrisiloxy)methylsilyl styrene, tris(methylbistrimethylsiloxysiloxy)silyl styrene, trimethylsiloxybis(tristrimethylsiloxysiloxy)silyl styrene, heptakis(trimethylsiloxy)trisiloxanyl styrene, tris (tristrimethylsiloxysiloxy)silyl styrene, (tristrimethylsiloxyhexamethyl)tetrasiloxy(tristrimethyl siloxy)siloxytrimethylsiloxysilyl styrene, nonakis (trimethylsiloxy)tetrasiloxanyl styrene, bis (tridecamethylhexasiloxy)methylsilyl styrene, heptamethylcyclotetrasiloxanyl styrene, heptamethylcyclotetrasiloxybis (trimethylsiloxy)silyl styrene, and tripropyltetramethylcyclotetrasiloxanyl styrene.

These hydrophobic silicon-containing monomers (B) may be used alone or in combination as a mixture of two or more of them. Among them, particularly preferred are tris (trimethylsiloxy)silylpropyl (meth)acrylate as an organopolysiloxane-containing alkyl (meth)acrylate, and tris(trimethylsiloxy)silyl styrene as an organopolysiloxane-containing styrene, from the viewpoint that they are excellent in copolymerizability with the methoxysilane compound (A).

The content of the hydrophobic silicon-containing monomer (B) in the polymerizable components, is usually at least 5 mol %, preferably at least 10 mol %, in order to impart excellent oxygen permeability not dependent on the water content, to the low water-absorptive ocular lens finally obtainable from the ocular lens material. Further, in order to maintain the strength, the hydrophilic nature and the transparency of the low water-absorptive ocular lens, the content of the hydrophobic silicon-containing monomer (B) in the polymerizable components, is preferably at most 80 mol %, more preferably at most 75 mol %.

Further, in the present invention, in addition to the above-mentioned hydrophobic silicon-containing monomer (B), other monomers may be employed depending upon the desired physical property such as the water content of the low water-absorptive ocular lens material, as polymerizable compounds which are copolymerizable with the above methoxysilane compound (A) and which undergo no crosslinking reaction.

As such other monomers, monomers containing one copolymerizable unsaturated double bond i.e. monomers other than crosslinkable monomers or crosslinkable macromonomers having at least two polymerizable groups, may be mentioned. Otherwise, monomers which do not have a functional group which is likely to react with a methoxysilane group to form a crosslinking structure at the time of the polymerization, such as a hydroxyl group, in their molecules, may preferably be employed as such other monomers. However, in a case where a monomer having such a functional group, is employed, the amount may be adjusted to such a level that an adequate crosslinking reaction can be carried out among methoxysilane groups, as in the case of an after-mentioned hydrophilic monomer having a functional group capable of forming a crosslinked structure upon reaction with a methoxysilane group.

The above-mentioned other monomers may, for example, be monomers useful for adjusting the hardness of the resulting low water-absorptive ocular lens material or for imparting e.g suitable strength, hydrophilic nature or deposit resistance to the ocular lens material.

For example, in order to control the hardness of the low water-absorptive ocular lens material to impart a desired softness or strength thereto, one or more members may be selected for use from the group of hardness-controlling monomers including linear, branched or cyclic alkyl (meth) acrylates, alkoxyalkyl (meth)acrylates or alkylthioalkyl (meth)acrylates, such as methyl (meth)acrylate, ethyl (meth) acrylate, isopropyl (meth)acrylate, n-propyl (meth)acrylate, isobutyl (meth)acrylate, n-butyl (meth)acrylate, 2-ethylhexyl (meth)acrylate, n-octyl (meth)acrylate, n-decyl (meth)acrylate, n-dodecyl (meth)acrylate, t-butyl (meth)

acrylate, pentyl (meth)acrylate, t-pentyl (meth)acrylate, hexyl (meth)acrylate, heptyl (meth)acrylate, nonyl (meth) acrylate, stearyl (meth)acrylate, cyclopentyl (meth)acrylate, cyclohexyl (meth)acrylate, 2-ethoxyethyl (meth)acrylate, 3-ethoxypropyl (meth)acrylate, 2-methoxyethyl (meth) acrylate, 3-methoxypropyl (meth)acrylate, ethylthioethyl (meth)acrylate, and methylthioethyl (meth)acrylate; styrene; α-methylstyrene; alkyl styrenes such as methyl styrene, ethyl styrene, propyl styrene, butyl styrene, t-butyl styrene, isobutyl styrene, and pentyl styrene; an alkyl-α-methyl styrenes such as methyl-α-methyl styrene, ethyl-α-methyl styrene, propyl-α-methyl styrene, butyl-α-methyl styrene, t-butyl-α-methyl styrene, isobutyl-α-methyl styrene, and pentyl-α-methyl styrene. When these monomers are used, it is also possible to adjust the water content of the ocular lens material. Among these, alkyl (meth)acrylates and alkyl styrenes are particularly preferred, since they are excellent, for example, in copolymerizability with the methoxysilane compound (A). Further, a monomer, of which the glass transition point (hereinafter referred to as Tg) of the homopolymer, would be at most 40° C., is preferably employed.

Further, to impart a suitable hydrophilic nature to the low water-absorptive ocular lens material, one or more members may be selected for use from the group of hydrophilic monomers including a hydroxyl group-containing monomer such as hydroxy styrene or a hydroxyalkyl (meth)acrylate such as 2-hydroxyethyl (meth)acrylate, hydroxybutyl (meth) acrylate or hydroxypropyl (meth)acrylate; an amino group-containing monomer such as amino styrene or an (alkyl) aminoalkyl (meth)acrylate such as 2-dimethylaminoethyl (meth)acrylate or 2-butylaminoethyl (meth)acrylate; an amide type monomer such as a dialkyl (meth)acrylamide such as N,N-dimethyl (meth)acrylamide, N,N-diethyl (meth)acrylamide or N,N-methylethyl (meth)acrylamide, or an alkyl (meth)acrylamide such as methyl (meth)acrylamide or ethyl (meth)acrylamide; an alkylene glycol mono(meth) acrylate such as propylene glycol mono(meth)acrylate; a pyrrolidone type monomer such as vinyl pyrrolidone; (meth) acrylic acid, maleic anhydride, fumaric acid, and a fumaric acid derivative.

If such a hydrophobic silicon-containing monomer is a monomer having a functional group such as a hydroxyl group, such a functional group is likely to preliminarily react with the methoxy group in the above methoxysilane compound (A) to form many crosslinking structures. To avoid such a possibility, it is particularly preferred to employ an amide type monomer or a pyrrolidone type monomer which does not have a functional group such as a hydroxyl group, a carboxyl group, an amino group or a glycol residue which is likely to react with the methoxysilane group in the above methoxysilane compound (A).

In the present invention, the substantially non-crosslinked material may be a material having a crosslinked structure partially formed to such an extent not to impair purpose of the present invention, for example, a material having a crosslinked structure partially formed, which is obtained by using the above-mentioned hydrophilic monomer containing a hydroxyl group.

Further, to impart deposit resistance to the low water-absorptive ocular lens material, a fluorine-containing monomer of the formula (III):

wherein $R^2$ is a hydrogen atom or a methyl group, s is an integer of from 1 to 15, t is an integer of from 1 to (2s+1), and u is an integer of from 0 to 2, may be used.

Typical examples of the fluorine-containing monomer of the formula (III) include 2,2,2-triflouroethyl (meth)acrylate, 2,2,3,3-tetrafuloropropyl (meth)acrylate, 2,2,3,3-tetrafluoro-t-pentyl (meth)acrylate, 2,2,3,4,4,,4-hexafluorobutyl (meth)acrylate, 2,2,3,4,4,4-hexafluoro-t-hexyl (meth)acrylate, 2,3,4,5,5,5-hexafluoro-2,4-bis(trifluoromethyl)pentyl (meth)acrylate, 2,2,3,3,4,4-hexafluorobutyl (meth)acrylate, 2,2,2,2',2', 2'-hexafluoroisopropyl (meth)acrylate, 2,2,3,3,4,4,4-heptaflourobutyl (meth)acrylate, 2,2,3,3,4,4,5,5-octafluoropentyl (meth)acrylate, 2,2,3,3,4,4,5,5,5-nonaflouropentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8,8-tridecafluorooctyl (meth)acrylate, 2,2,3,3,4,4,5,5,6,6,7,7,7-tridecafluoroheptyl (meth)acrylate, 3,3,4,4,5,5,6,6,7,7,8,8,9,9,10,10-hexadecafluorodecyl (meth)acrylate, 3,3,4,4,5,5,6,6,7,7,8,8,9,9,10,10,10-heptadecafluorodecyl (meth)acrylate, 3,3,4,4,5,5,6,6,7,7,8,8,9,9,10,10,11,11-octadecafluoroundecyl (meth)acrylate, 3,3,4,4,5,5,6,6,7,7,8,8,9,9,10,10,11,11,11-nonadecafluoroundecyl (meth)acrylate, 3,3,4,4,5,5,6,6,7,7,8,8,9,9,10,10,11,11,12,12-encosafluorododecyl (meth)acrylate, 2-hydroxy-4,4,5,5,6,7,7,7-octafluoro-6-trifluoropentylheptyl (meth)acrylate, 2-hydroxy-4,4,5,5,6,6,7,7,8,9,9,9-dodecafluoro-8-trifluoromethylnonyl (meth)acrylate, and 2-hydroxy-4,4,5,5,6,6,7,7,8,8,9,9,10,11,11,11-hexadecafluoro-10-trifuloromethylundecyl (meth)acrylate. These monomers may be used alone or in combination as a mixture of two or more of them.

Among these, 2,2,2-trifluoroethyl (meth)acrylate and 2,2,2',2',2'-hexafluoroisopropyl (meth)acrylate are particularly preferred, since they are excellent in copolymerizability with e.g. the methoxysilane compound (A).

The content of the above described other monomers in the polymerizable components may be suitably adjusted so that the total amount of the polymerizable components becomes 100 mol %. However, to obtain adequate effects by the use of such other monomers, their content is preferably at least 5 mol %, particularly preferably at least 10 mol %. On the other hand, in order to avoid such a possibility that the contents of the methoxysilane compound (A) and the hydrophobic silicon-containing monomer (B) become relatively so small that the oxygen permeability of the ocular lens material decreases, or the amount of the methoxysilane groups in the shaped product obtained from such an ocular lens material becomes so small that no adequate crosslinking can be carried out, the content of such other monomers is preferably at most 65 mol %, particularly preferably at most 60 mol %.

Especially when, hydrophilic monomers are to be used as said other monomers, their content in the polymerizable components is preferably at most 55 mol %, in order to avoid such a possibility that by the hydrophilic monomers, the water content of the finally obtainable ocular lens increases too much.

Further, in a case where monomers having functional groups which are likely to react with methoxysilane groups derived from the methoxysilane compound (A) to form a crosslinked structure during polymerization for the preparation of an ocular lens material, such as hydroxyl group-containing monomers among hydrophilic monomers, their amount is preferably at a level where ethoxysilane groups can adequately be crosslinked to one another even when said functional groups and methoxysilane groups are reacted, for example, at most 10 mol per 100 mol of the methoxysilane compound (A).

Furthermore, as other monomers, silicone oligomers having alkoxy silane groups at their both terminals, may be used which are capable of undergoing crosslinking reaction upon contact with water at the time of shaving a molded product made of the resulting ocular lens material into an oscular lens, like the above-mentioned methoxysilane compound (A), or which is capable of imparting oxygen permeability to the ocular lens material like the above hydrophobic silicon-containing monomer (B), although they do not have polymerizable unsaturated double bonds.

Such silicone oligomers are compounds which can be subjected to a crosslinking reaction by a condensation (hydrolytic) reaction of alkoxy silane groups to one another in their molecules, or which are capable of imparting oxygen permeability based on silicone chains in their molecules.

Typical examples of such silicone oligomers include oligomers of the formula (IV):

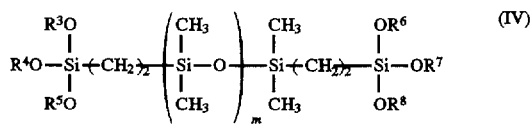

wherein each of $R^3$, $R^4$, $R^5$, $R^6$, $R^7$ and $R^8$ which are independent of one another, is a $C_{1-3}$ alkyl group, and m is an integer of from 1 to 30, such as a compound of the formula:

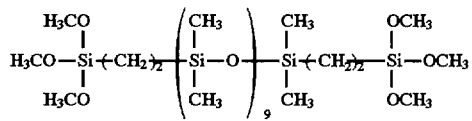

In the above formula (IV), each of $R^3$, $R^4$, $R^5$, $R^6$, $R^7$ and $R^8$ is preferably a methyl group in view of the reactivity. If m is an integer exceeding 30, the optical properties such as the transparency, of the finally obtainable ocular lens, tends to be poor.

The content of such a silicone oligomer in the polymerizable components may suitably be adjusted so that the total amount of the polymerizable components becomes 100 mol %. However, to obtain adequate effects by the use of such a silicone oligomer, its content is preferably at least 0.5 mol %, preferably at least 1 mol %, and to avoid a deterioration in the optical properties such as transparency, of the finally obtainable ocular lens, its content is preferably at most 5 mol %, particularly preferably at most 3 mol %.

Further, in order to impart ultraviolet absorptivity or a color to the resulting low water-absorptive ocular lens material, a polymerizable ultraviolet absorber, a polymerizable dyestuff or a polymerizable ultraviolet absorbing dyestuff, which has a color forming functional group or an ultraviolet absorbing functional group, may, for example, be used as other monomer.

Specific examples of the polymerizable ultraviolet absorber include benzophenone type polymerizable ultraviolet absorbers such as 2-hydroxy-4-(meth)acryloyloxybenzophenone, 2-hydroxy-4-(meth)acryloyloxy-5-tert-butylbenzophenone, 2-hydroxy-4-(meth)acryloyloxy-2',4'-dichlorobenzophenone and 2-hydroxy-4-(2'-hydroxy-3'-(meth)acryloyloxypropoxy)benzophenone; benzotriazole type polymerizable ultraviolet absorbers such as 2-(2'-hydroxy-5'-(meth)acryloyloxyethylphenyl)-2H-benzotriazole, 2-(2'-hydroxy-5'-(meth)acryloyloxyethylphenyl)-5-chloro-2H-benzotriazole, 2-(2'-hydroxy-5'-(meth)acryloyloxypropylphenyl)-2H-benzotriazole and 2-(2'-hydroxy-5'-(meth)acryloyloxypropyl-3'-tert-butylphenyl)-5-chloro-2H-benzotriazole; salicylic acid derivative-type polymerizable ultraviolet absorbers such as phenyl 2-hydroxy-4-(meth)acryloyloxymethylbenzoate; and other polymerizable ultraviolet absorbers such as methyl 2-cyano-3-phenyl-3-(3'-(meth)acryloyloxyphenyl)propenoate. These polymerizable ultraviolet absorbers may be used alone or in combination as a mixture of two or more of them.

Specific examples of the polymerizable dyestuff include azo type polymerizable dyestuffs such as 1-phenylazo-4-(meth)acryloyloxynaphthalene, 1-phenylazo-2-hydroxy-3-(meth)acryloyloxynaphthalene, 1-naphthylazo-2-hydroxy-3-(meth)acryloyloxynaphthalene, 1-(α-anthrylazo)-2-hydroxy-3-(meth)acryloyloxynaphthalene, 1-((4'-(phenylazo)phenyl)azo)-2-hydroxy-3-(meth)acryloyloxynaphthalene, 1-(2',4'-xylylazo)-2-(meth)acryloyloxynaphthalene, 1-(o-tolylazo)-2-(meth)acryloyloxynaphthalene, 2-(m-(meth)acryloylamideanilino)-4,6-bis(1'-(o-tolylazo)-2'-naphthylamino)-1,3,5-triazine, 2-(m-vinylanilino)-4-((4'-nitrophenylazo)anilino)-6-chloro-1,3,5-triazine, 2-(1'-(o-tolylazo)-2'-naphthyloxy-4-(m-vinylanilino)-6-chloro-1,3,5-triazine, 2-(p-vinylanilino)-4-(1'-(o-tolylazo)-2'-naphthylamino)-6-chloro-1,3,5-triazine, N-(1'-(o-tolylazo)-2'-naphthyl)-3-vinylphthalic acid monoamide, N-(1'-(o-tolylazo)-2'-naphthyl)-6-vinylphthalic acid monoamide, 3-vinylphthalic acid-(4'-(p-sulfophenylazo)-1'-naphthyl)monoester, 6-vinylphthalic acid-(4'-(p-sulfophenylazo)-1'-naphthyl)monoester, 3-(meth)acryloylamide-4-phenylazophenol, 3-(meth)acryloylamide-4-(8'-hydroxy-3',6'-disulfo-1'-naphthylazo)phenol, 3-(meth)acryloylamide-4-(1'-phenylazo-2'-naphthylazo)phenol, 3-(meth)acryloylamide-4-(p-tolylazo)phenol, 2-amino-4-(m-(2'-hydroxy-1'-naphthylazo)anilino)-6-isopropenyl-1,3,5-triazine, 2-amino-4-(N-methyl-p-(2'-hydroxy-1'-naphthylazo)anilino)-6-isopropenyl-1,3,5-triazine, 2-amino-4-(m-(4'-hydroxy-1'-phenylazo)anilino)-6-isopropenyl-1,3,5-triazine, 2-amino-4-(N-methyl-p-(4'-hydroxyphenylazo)anilino)-6-isopropenyl-1,3,5-triazine, 2-amino-4-(m-(3'-methyl-1'-phenyl-5'-hydroxy-4'-pyrazolylazo)anilino)-6-isopropenyl-1,3,5-triazine, 2-amino-4-(N-methyl-p-(3'-methyl-1'-phenyl-5'-hydroxy-4'-pyrazolylazo)anilino)-6-isopropenyl-1,3,5-triazine, 2-amino-4-(p-phenylazoanilino)-6-isopropenyl-1,3,5-triazine and 4-phenylazo-7-(meth)acryloylamide-1-naphthol; anthraquinone type polymerizable dyestuffs such as 1,5-bis((meth)acryloylamino)-9,10-anthraquinone, 1-(4'-vinylbenzoylamide)-9,10-anthraquinone, 4-amino-1-(4'-vinylbenzoylamide)-9,10-anthraquinone, 5-amino-1-(4'-vinylbenzoylamide)-9,10-anthraquinone, 8-amino-1-(4'-vinylbenzoylamide)-9,10-anthraquinone, 4-nitro-1-(4'-vinylbenzoylamide)-9,10-anthraquinone, 4-hydroxy-1-(4'-vinylbenzoylamide)-9,10-anthraquinone, 1-(3'-vinylbenzoylamide)-9,10-anthraquinone, 1-(2'-vinylbenzoylamide)-9,10-anthraquinone, 1-(4'-isopropenylbenzoylamide)-9,10-anthraquinone, 1-(3'-isopropenylbenzoylamide)-9,10-anthraquinone, 1-(2'-isopropenylbenzoylamide)-9,10-anthraquinone, 1,4-bis-(4'-vinylbenzoylamide)-9,10-anthraquinone, 1,4-bis-(4'-isopropenylbenzoylamide)-9,10-anthraquinone, 1,5-bis-(4'-vinylbenzoylamide)-9,10-anthraquinone, 1,5-bis-(4'-isopropenylbenzoylamide)-9,10-anthraquinone, 1-methylamino-4-(3'-vinylbenzoylamide)-9,10-anthraquinone, 1-methylamino-4-(4'-vinylbenzoyloxyethylamino)-9,10-anthraquinone, 1-amino-4-(3'-vinylphenylamino)-9,10-anthraquinone-2-sulfonic acid, 1-amino-4-(4'-vinylphenylamino)-9,10-anthraquinone-2-sulfonic acid, 1-amino-4-(2'-vinylbenzylamino)-9,10-anthraquinone-2-sulfonic acid, 1-amino-4-(3'-(meth)acryloylaminophenylamino)-9,10-anthraquinone-2-sulfonic acid, 1-amino-4-(3'-(meth)acryloylaminobenzylamino)-9,10-anthraquinone-2-sulfonic acid, 1-(β-ethoxycarbonylallylamino)-9,10-anthraquinone, 1-(β-carboxyallylamino)-9,10-anthraquinone, 1,5-di-(β-carboxyallylamino)-9,10-anthraquinone, 1-(β-isopropoxycarbonylallylamino)-5-benzoylamide-9,10-anthraquinone, 2-(3'-(meth)acryloylamide-anilino)-4-(3'-(3"-sulfo-4"-aminoanthraquinon-1"-yl)amino-anilino)-6-chloro-1,3,5-triazine, 2-(3'-(meth)acryloylamide-anilino)-4-(3'-(3"-sulfo-4"-aminoanthraquinon-1"-yl)amino-anilino)-6-hydrazino-1,3,5-triazine, 2,4-bis-((4"-methoxyanthraquinon-1"-yl)amino)-6-(3'-vinylanilino)-1,3,5-triazine and 2-(2'-vinylphenoxy)-4-(4'-(3"-sulfo-4"-aminoanthraquinon-1"-yl-amino)anilino)-6-chloro-1,3,5-triazine; nitro type polymerizable dyestuffs such as o-nitroanilinomethyl (meth)acrylate; and phthalocyanine type polymerizable dyestuffs such as (meth)acryloyl-modified tetraamino copper phthalocyanine and (meth)acryloyl-modified (dodecanoyl-modified tetraamino copper phthalocyanine). These polymerizable dyestuffs may be used alone or in combination as a mixture of two or more of them.

Specific examples of the polymerizable ultraviolet absorbing dyestuff include benzophenone type polymerizable ultraviolet absorbing dyestuffs such as 2,4-dihydroxy-3-(p-styrenoazo)benzophenone, 2,4-dihydroxy-5-(p-styrenoazo)benzophenone, 2,4-dihydroxy-3-(p-(meth)acryloyloxymethylphenylazo)benzophenone, 2,4-dihydroxy-5-(p-(meth)acryloyloxymethylphenylazo)benzophenone, 2,4-dihydroxy-3-(p-(meth)acryloyloxyethylphenylazo)benzophenone, 2,4-dihydroxy-5-(p-(meth)acryloyloxyethylphenylazo)benzophenone, 2,4-dihydroxy-3-(p-(meth)acryloyloxypropylphenylazo)benzophenone, 2,4-dihydroxy-5-(p-(meth)acryloyloxypropylphenylazo)benzophenone, 2,4-dihydroxy-3-(o-(meth)acryloyloxymethylphenylazo)benzophenone, 2,4-dihydroxy-5-(o-(meth)acryloyloxymethylphenylazo)benzophenone, 2,4-dihydroxy-3-(o-(meth)acryloyloxyethylphenylazo)benzophenone, 2,4-dihydroxy-5-(o-(meth)acryloyloxyethylphenylazo)benzophenone, 2,4-dihydroxy-3-(o-(meth)acryloyloxypropylphenylazo)benzophenone, 2,4-dihydroxy-5-(o-(meth)acryloyloxypropylphenylazo)benzophenone, 2,4-dihydroxy-3-(p-(N,N-di(meth)acryloyloxyethylamino)phenylazo)benzophenone, 2,4-dihydroxy-5-(p-(N,N-di(meth)acryloyloxyethylamino)phenylazo)benzophenone, 2,4-dihydroxy-3-(o-(N,N-di(meth)acryloyloxyethylamino)phenylazo)benzophenone, 2,4-dihydroxy-5-(o-(N,N-di(meth)acryloylethylamino)phenylazo)benzophenone, 2,4-dihydroxy-3-(p-(N-ethyl-N-(meth)acryloyloxyethylamino)phenylazo)benzophenone, 2,4-dihydroxy-5-(p-(N-ethyl-N-(meth)acryloyloxyethylamino)phenylazo)benzophenone, 2,4-dihydroxy-3-(o-(N-ethyl-N-(meth)acryloyloxyethylamino)phenylazo)benzophenone, 2,4-dihydroxy-5-(o-(N-ethyl-N-(meth)acryloyloxyethylamino)phenylazo)benzophenone, 2,4-dihydroxy-3-(p-(N-ethyl-N-(meth)acryloylamino)phenylazo)benzophenone, 2,4-dihydroxy-5-(p-(N-ethyl-N-(meth)acryloylamino)phenylazo)benzophenone, 2,4-dihydroxy-3-(o-(N-ethyl-N-(meth)acryloylamino)phenylazo)benzophenone and 2,4-dihydroxy-5-(o-(N-ethyl-N-(meth)acryloylamino)phenylazo)benzophenone; and benzoic acid type polymerizable ultraviolet absorbing dyestuffs such as phenyl 2-hydroxy-4-(p-styrenoazo)benzoate. These polymerizable ultraviolet absorbing dyestuffs may be used alone or in combination as a mixture of two or more of them.

The content of the above-mentioned polymerizable ultraviolet absorber, polymerizable dyestuff and polymerizable ultraviolet absorbing dyestuff is suitably adjusted so that the total amount of the polymerizable components becomes 100 mol %. Such a content is substantially influenced by the thickness of the lens, but it is usually at least 0.0001 mol %, preferably at least 0.001 mol %, so that the effects of using them are sufficiently obtained. On the other hand, in order not to deteriorate the physical properties of the lens, such as the mechanical strength, such a content is usually at most 0.1 mol %, preferably at most 0.05 mol %.

Further, in consideration of the toxicity of the ultraviolet absorber or dyestuff, due care is necessary to make the material suitable as a material for ocular lenses such as contact lenses which are in direct contact with living tissues or intraocular lenses embedded in living bodies. Further, particularly in the case of a dyestuff, due care is necessary not to let the color of the lens be so deep that the transparency decreases, and visible rays tend to be hardly transmitted through the lens.

The substantially non-crosslinked low water-absorptive ocular lens material of the present invention can be obtained by polymerizing the polymerizable components comprising the methoxysilane compound (A) and the hydrophobic silicon-containing monomer (B), and, if necessary, other monomers.

In the present invention, the polymerization can be carried out by a conventional method by adjusting the amounts of the methoxysilane compound (A) and the hydrophobic silicon-containing monomer (B) as well as the amounts of other monomers and adding e.g. a radical polymerization initiator thereto.

The conventional method is, for example, a method wherein a radical polymerization initiator is added to the polymerizable components in a suitable mold or container, followed by gradual heating within a temperature range of from room temperature to 130° C. for from 2 to 72 hours, or by irradiation of an electromagnetic wave such as a microwave, ultraviolet rays or a radiation (such as γ-rays). In the case of heat polymerization, the temperature may stepwise be raised for quenching. The polymerization may be carried out by a bulk polymerization method or a solution polymerization method employing e.g. a solvent such as tetrahydrofuran or toluene, or by other methods.

Typical examples of the above-mentioned radical polymerization initiator include azobisisobutyronitrile, azobisodimethylvaleronitrile, benzoyl peroxide, t-butyl hydroperoxide and cumene hydroperoxide. These initiators may be used alone or in combination as a mixture of two or more of them.

In a case where the polymerization is carried out by means of e.g. light rays, it is preferred to further incorporate a photopolymerization initiator or a sensitizer. The amount of such a photopolymerization initiator or a sensitizer is usually from 0.001 to 2 parts by weight, preferably from 0.01 to 1 part by weight, per 100 parts by weight of the total amount of the polymerizable components.

The low water-absorptive ocular lens material of the present invention may be in such a form that the ocular lens material can be subjected to shaping to obtain a low water-absorptive ocular lens shaped product as described hereinafter. As such a form, a rod-, block-, plate-, sheet- or powder-form may, for example, be mentioned. To obtain an ocular lens material of e.g. a rod-, block, plate- or sheet-form, the polymerization of the polymerizable components may be carried out, for example, in a test tube or in a mold or container such as a cell mold. Further, to obtain an ocular lens material of e.g. a powder form, a solution polymerization may be carried out, and the polymer solution thereby obtained may be dropwise added to a poor solvent for the polymer, such as hexane or dioxane, whereupon the obtained polymer is dried.

The water content of the low water-absorptive ocular lens material thus obtained, may be within such a range to satisfy the water content, dimensional stability, etc. of the finally obtainable low water-absorptive ocular lens.

Further, the low water-absorptive ocular lens material preferably has a number average molecular weight of at least 50,000 to make sure that an adequate quantity of methoxysilane groups are present in its molecule, and the crosslinking reaction of the shaped product formed from that material will proceed sufficiently. Further, to maintain the fluidity of the low water-absorptive ocular lens material during molding, the number average molecular weight of the ocular lens material is preferably at most 3,000,000.

Then, a low water-absorptive ocular lens shaped product of the present invention can be obtained by shaping the above ocular lens material into a shape of a desired ocular lens.

As a shaping method for shaping the above ocular lens material, an injection molding method or a compression molding method may, for example, be mentioned. In the present invention, two or more of such molding methods may be used in combination, and if required, mechanical processing such as cutting, grinding or polishing may also be applied.

The injection molding method is a method wherein the ocular lens material is put into an injection molding machine provided with a mold having a shape of a desired ocular lens, and the ocular lens material heated to a molten state at a temperature of from 80° to 350° C. is injected into the mold under a high pressure of from 300 to 1,500 kgf/cm$^2$, followed by maintaining the pressure, then the ocular lens material in the mold is solidified, and the mold is opened to obtain a shaped product.

The above compression molding method is a method wherein a compression molding machine provided with a mold having a shape of a desired ocular lens, is used in such a manner that a necessary amount of the ocular lens material of a powder- or plate-form, or tablets obtained by preliminarily shaping the powder-form ocular lens material, are put into the above mold and, after closing the mold, pressed under a pressure of from 300 to 1,500 kgf/cm$^2$ and heated at a temperature of from 80° to 350° C., over a period of from 5 to 60 minutes, to cure the ocular lens material, and then the mold is opened to obtain a shaped product.

To prepare an intraocular lens among low water-absorptive ocular lenses, shaped products corresponding to the lens portion and the support portion of an intraocular lens may separately be formed, and they may be later bonded to each other. Otherwise, they may be integrally molded.

Then, the above ocular lens shaped product is contacted with water to have the shaped product crosslinked, to obtain a low water-absorptive ocular lens of the present invention.

As a method of contacting the ocular lens shaped product with water, boiling treatment in water, autoclave (high temperature high pressure steam) treatment, acid treatment, a method of holding in water or a method of holding under high humidity may, for example, be mentioned.

The boiling treatment in water is a method which comprises immersing the ocular lens shaped product in a water bath, followed by boiling treatment for from 1 to 72 hours.

The acid treatment is a method which comprises immersing the ocular lens shaped product in an acid solution such as a hydrochloride acid solution with a concentration of e.g. from 0.01 to 1 mol/l (N), for acid treatment.

The method of holding in water is a method which comprises immersing the ocular lens shaped product in water at a temperature of e.g. from 20° to 60° C. for from 5 to 120 minutes.

The method of holding under high humidity is a method which comprises holding the ocular lens shaped product in a high humidity atmosphere with a relative humidity of e.g. from 80 to 100% for from 2 to 72 hours for treatment.

In the present invention, these methods may be used in a proper combination of two or more of them to contact the ocular lens shaped product with water.

By crosslinking the substantially non-crosslinked ocular lens shaped product in this manner, a low water-absorptive ocular lens of the present invention can be obtained.

The water content of the obtained ocular lens upon absorption of water, is preferably at most 30 wt %, more preferably at most 25 wt %, particularly in order to obtain adequate effects for improving the oxygen permeability by the hydrophobic silicon-containing monomer (B) and with a view to controlling the crosslinking reaction and swelling of the ocular lens by hydration. In the present invention, the water content of the ocular lens may be adjusted by properly adjusting the types and amounts of the hydrophobic silicon-containing monomer (B) and other monomers such as hydrophilic monomers, which are used to prepare the ocular lens material.

The low water-absorptive ocular lens obtained by crosslinking the shaped product formed by shaping the substantially non-crosslinked ocular lens material of the present invention, is excellent not only in the transparency and oxygen permeability but also in dimensional stability and durability, and it can be prepared with high precision at a low cost and at high productivity by the process of the present invention.

Now, the present invention will be described in further detail with reference to Examples. However, it should be understood that the present invention is by no means restricted to such specific Examples.

EXAMPLE 1

The polymerizable components as identified in Table 1 were blended with azobisisobutyronitrile (hereinafter referred to as AIBN) as a polymerization initiator in an amount as identified in Table 1, per 100 parts by weight of the polymerizable components, and the mixture was sealed in a test tube.

Then, the test tube was immersed in a constant-temperature bath, and the polymerizable components were polymerized over a period of 48 hours while gradually raising the temperature from 35° C. to 50° C.

The test tube was further transferred to a drier, and the temperature was gradually raised to 120° C. over a period of 14 hours for quenching, to obtain a substantially non-crosslinked low water-absorptive ocular lens material as a rod having a diameter of about 15 mm. The number average molecular weight of the ocular lens material is shown in Table 1.

The obtained rod-shaped ocular lens material was cut into a plate having a thickness of 1 mm, which was put into a mold corresponding to a shape of a contact lens (thickness: 0.2 mm, diameter: 12 mm), mounted on a compression molding machine and after closing the mold, heated under a pressure of 820 kgf/cm$^2$ at 250° C. over a period of 35 minutes to cure the ocular lens material, whereupon the mold was opened, and the shaped product was taken out, followed by cutting and grinding of the edge, to obtain a low water-absorptive contact lens shaped product in a dry state. Then, the contact lens shaped product obtained by the above compression molding was immersed in a physiological saline solution, which was then put into an autoclave and treated with high temperature high pressure steam of 121° C. for 20 minutes, to obtain a crosslinked low water-absorptive contact lens.

The obtained contact lens had adequate properties as a contact lens.

Further, the size of the obtained contact lens was measured, whereby the size was exactly the same as the desired size with a thickness of 0.2 mm and a diameter of 12 mm, thus indicating that the contact lens was prepared with extremely high precision.

Further, the transparency, water content, oxygen permeability and size change as physical properties of the contact lens were examined by the following methods. The results are shown in Table 1.

(a) Transparency

The contact lens was visually observed and evaluated in accordance with the following evaluation standards.

Evaluation Standards

A: Transparent without any turbidity

B: Slightly turbid

C: Substantially turbid (b) Water content

The water content (wt %) was calculated by the following formula:

Water content (wt %)={(W—$W_0$)/W}×100 where W is the weight (g) of the contact lens upon absorption of water to the equilibrium state, and $W_0$ is the weight (g) of the contact lens in a dried state.

(c) Oxygen permeability ($Dk_{o_2}$)

Using a Seikaken type film oxygen permeability meter manufactured by Rika Seiki Kogyo K.K., the oxygen permeability coefficient of the contact lens was measured in a physiological sodium chloride aqueous solution at 35° C. The unit of the oxygen permeability coefficient is ml (STP) -$cm^2$/-($cm^3$·sec·mmHg), and the oxygen permeability coefficient in Table 1 is a numerical value obtained by multiplying the value of the oxygen permeability coefficient of the contact lens having a thickness of 0.2 mm by $10^{11}$.

(d) Size change

The contact lens was subjected to boiling treatment over a period of 200 hours, whereupon the size (diameter) was measured, and the size change (%) with respect to the diameter, was calculated by the following formula from the measured value and the size (diameter) before the boiling treatment.

Size change (%)={|D—$D_0$|/$D_0$}×100 where D is the size (diameter (mm)) after the boiling treatment, and $D_0$ is the size (diameter (mm)) before the boiling treatment.

EXAMPLES 2 TO 6

Substantially non-crosslinked low water-absorptive ocular lens materials were prepared in the same manner as in Example 1 except that in Example 1, the types and amounts of the polymerizable components were changed as shown in Table 1. The number average molecular weights of these ocular lens materials are shown in Table 1.

Using the obtained ocular lens materials, low water-absorptive contact lens shaped products in a dry state were obtained in the same manner as in Example 1.

Then, the obtained contact lens shaped products were treated with high temperature high pressure steam in the same manner as in Example 1, to obtain crosslinked low water-absorptive contact lenses.

The obtained contact lenses had adequate properties as contact lenses.

Further, the sizes of the obtained contact lenses were measured, whereby they were exactly the same as the desired sizes with a thickness of 0.2 mm and a diameter of 12 mm, thus indicating that they were prepared with extremely high precision.

Further, the physical properties of these contact lenses were examined in the same manner as in Example 1. The results are shown in Table 1.

In Examples 1 to 6, there were no contact lenses which were damaged by the boiling treatment over 200 hours during the measurements of the size change (d), and there were no changes in their appearance and shapes.

The abbreviations used in Table 1 represent the following compounds.

SiOMA: Trimethoxysilylpropyl (meth)acrylate of the formula:

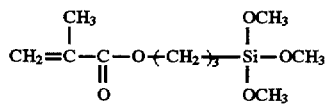

SiOSt: p-Trimethoxysilyl styrene of the formula:

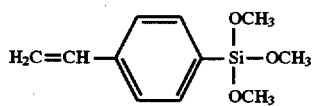

SiSt: Tris(trimethylsiloxy)silyl styrene

NVP: N-Vinyl pyrrolidone

SiO oligomer: A silicone oligomer having methoxysilane groups at both terminals, of the formula:

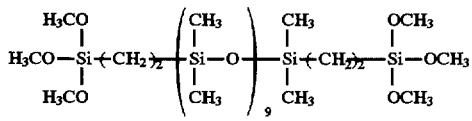

TABLE 1

| Example No. | Polymerizable components (mol) SiOMA | SiOSt | SiSt | NVP | SiO oligomer | Amount of AIBN per 100 parts by weight of the polymerizable components (parts by weight) | Number average molecular weight of ocular lens material | Physical properties of contact lens Transparency | Water content (wt %) | Oxygen permeability ($Dk_{0.2}$) | Size change (%) |
|---|---|---|---|---|---|---|---|---|---|---|---|
| 1 | 55 | — | 45 | — | — | 0.1 | ≧1,000,000 | A | 1 | 97 | ≦1 |
| 2 | 64 | — | 36 | — | — | 0.1 | ≧1,000,000 | A | 1 | 63 | ≦1 |
| 3 | — | 28 | 38 | 34 | — | 0.1 | ≧1,000,000 | A | 7 | 112 | ≦1 |
| 4 | — | 70 | 11 | 29 | — | 0.1 | ≧1,000,000 | A | 9 | 50 | ≦1 |
| 5 | — | 26 | 20 | 54 | — | 0.1 | ≧1,000,000 | A | 19 | 73 | ≦1 |
| 6 | — | 28 | 12 | 55 | 2 | 0.1 | ≧1,000,000 | A | 25 | 64 | ≦1 |

From the results shown in Table 1, it is evident that each of the contact lenses obtained in Examples 1 to 6 was excellent in transparency and oxygen permeability, had low water-absorptivity with a water content of from 1 to 25 wt % and further was excellent in the dimensional stability and durability with its size change being extremely small at a level of at most 1% even when subjected to severe boiling treatment over a period of 200 hours.

The substantially non-crosslinked low water-absorptive ocular lens material of the present invention is the one to which a shaping method capable of producing a large quantity of ocular lenses such as contact lenses or intraocular lenses all at once at a low cost, is applicable.

Further, the low water-absorptive ocular lens of the present invention prepared by crosslinking a low water-absorptive ocular lens shaped product obtained by shaping the above ocular lens material by the above shaping method, is excellent not only in transparency and oxygen permeability but also in dimensional stability and durability.

Furthermore, according to the process of the present invention, the low water-absorptive ocular lens which is excellent not only in transparency and oxygen permeability but also in dimensional stability and durability, can be produced with high precision in a desired shape at high productivity.

What is claimed is:

1. A process for producing a low water-absorptive ocular lens, which comprises polymerizing polymerizable components comprising a methoxysilane compound (A) of the formula (I):

$$X\text{—}Z\text{—}Si(OCH_3)_n(R^1)_{3-n} \quad (I)$$

wherein X is a (meth)acryloyloxy group, a vinyl group, a group of the formula $H_2C\!=\!CH$

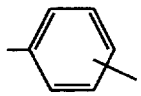

or an allyl group, Z is a direct bond or a $C_{1-3}$ alkylene group, $R^1$ is a $C_{1-6}$ alkyl group, and n is an integer of from 1 to 3, and a hydrophobic silicon-containing monomer (B) selected from the group consisting of an organopolysiloxane-containing alkyl(meth)acrylate, an alkylvinyl silane, an organopolysiloxane-containing styrene of the formula (II):

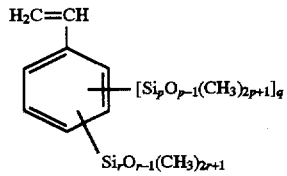

wherein p is an integer from 1 to 15, q is 0 or 1, and r is an integer from 1 to 15, and a mixture thereof which is copolymerizable with the methoxysilane compound (A) and which undergoes no crosslinking reaction, to obtain a substantially non-crosslinked low water-absorptive ocular lens material, shaping the low water-absorptive ocular lens material into a shape of desired ocular lens, to obtain a low water-absorptive ocular lens shaped product, and contacting the low water-absorptive ocular lens shaped product with water to crosslink the low water-absorptive ocular lens shaped product.

2. The process for producing a low water-absorptive ocular lens according to claim 1, wherein the low water-absorptive ocular lens material is shaped by at least one molding method selected from the group consisting of an injection molding method and a compression molding method.

3. The process for producing a low water-absorptive ocular lens according to claim 1, wherein the low water-absorptive ocular lens shaped product is contacted with water by at least one method selected from the group consisting of boiling treatment in water, autoclave treatment, acid treatment, a method of holding in water or a method of holding under high humidity.

4. The process of claim 1, wherein said hydrophobic silicon-containing monomer (B) is an organopolysiloxane-containing alkyl(meth)acrylate.

5. The process of claim 4, wherein said hydrophobic silicon-containing monomer (B) is an organopolysiloxane-containing alkyl(meth)acrylate selected from the group consisting of pentamethyldisiloxanylmethyl (meth)acrylate, trimethylsiloxydimethylsilylpropyl (meth)acrylate, methylbis(trimethylsiloxy)silylpropyl (meth)acrylate, tris(trimethylsiloxy)silylpropyl (meth)acrylate, mono[methylbis(trimethylsiloxy) siloxy]bis(trimethyl siloxy)silylpropyl (meth)acrylate, tris[methylbis(trimethyylsiloxy) siloxy]silylpropyl (meth)acrylate, methyl[bis(trimethylsiloxy)]silylpropylglyceryl (meth)acrylate, tris(trimethylsiloxy)silylpropylglyceryl (meth)acrylate, mono[methylbis(trimethylsiloxy)siloxy]bis(trimethyl siloxy) silylpropylglyceryl (meth)acrylate, trimethylsilylethyltetramethyldisiloxanylpropylglyceryl (meth)acrylate, trimethylsilylmethyl (meth)acrylate, trimethylsilylpropyl (meth)acrylate, trimethylsilylpropylglyceryl (meth)acrylate, pentamethyldisiloxanylpropylglyceryl (meth)acrylate, methylbis(trimethylsiloxy)silylethyltetramethyl disiloxanylmethyl (meth)acrylate, tetramethyltriisopropylcyclotetrasiloxanylpropyl (meth)acrylate, tetramethyltriisopropylcyclotetrasiloxybis(trimethyl siloxy)silylpropyl (meth)acrylate, trimethylsiloxydimethylsilylpropyl (meth)acrylate, and mixtures thereof.

6. The process of claim 1, wherein said hydrophobic silicon-containing monomer (B) is an alkylvinyl silane.

7. The process of claim 6, wherein said hydrophobic silicon-containing monomer (B) is an alkylvinyl silane, said alkylvinyl silane being trimethylvinyl silane.

8. The process of claim 1, wherein said silicon-containing monomer (B) is an organopolysiloxane-containing styrene of formula (II):

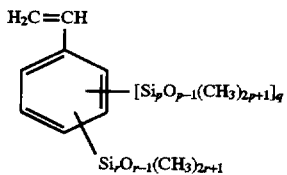

wherein p is an integer from 1 to 15, q is 0 or 1, and r is an integer from 1 to 15.

9. The process of claim 8, wherein said hydrophobic silicon-containing monomer (B) is the organopolysiloxane-containing styrene of said formula (II) selected from the group consisting of from tris(trimethylsiloxy)silyl styrene, bis (trimethylsiloxy) methylsilyl styrene, dimethylsilyl styrene, trimethylsilyl styrene, tris (trimethylsiloxy) siloxanyldimethylsilyl styrene, [bis (trimethylsiloxy) methylsiloxanyl]dimethylsilyl styrene, pentamethyldisiloxanyl styrene, heptamethyltrisiloxanyl styrene, nonamethyltetrasiloxanyl styrene, pentadecamethylheptasiloxanyl styrene, heneicosamethyldecasiloxanyl styrene, heptacosamethyltridecasiloxanyl styrene, hentriacontamethylpentadecasiloxanyl styrene, trimethylsiloxypentamethyldisiloxymethylsilylstyrene, tris (pentamethyldisiloxysilyl)styrene, (tristrimethylsiloxy) siloxanylbis(trimethylsiloxy)silyl styrene, bis (heptamethyltrisiloxy)methylsilyl styrene, tris (methylbistrimethylsiloxysiloxy)silyl styrene, trimethylsiloxybis(tristrimethylsiloxysiloxy)silyl styrene, heptakis(trimethylsiloxy)trisiloxanyl styrene, tris (tristrimethylsiloxysiloxy)silyl styrene, (tristrimethylsiloxyhexamethyl)tetrasiloxy(tristrimethyl siloxy)siloxytrimethylsiloxysilyl styrene, nonakis (trimethylsiloxy)tetrasiloxanyl styrene, bis (tridecamethylhexasiloxy)methylsilyl styrene, heptamethylcyclotetrasiloxanyl styrene, heptamethylcyclotetrasiloxybis(trimethylsiloxy)silyl styrene, tripropyltetramethylcyclotetrasiloxanyl styrene, and mixtures thereof.

* * * * *